US008259935B2

(12) United States Patent
Riedl

(10) Patent No.: US 8,259,935 B2
(45) Date of Patent: Sep. 4, 2012

(54) SECURE COMMUNICATION METHOD AND SYSTEM

(76) Inventor: John Thomas Riedl, New South Wales (AU)

( * ) Notice: Subject to any disclaimer, the term of this patent is extended or adjusted under 35 U.S.C. 154(b) by 480 days.

(21) Appl. No.: 12/299,816

(22) PCT Filed: May 11, 2007

(86) PCT No.: PCT/AU2007/000639
§ 371 (c)(1),
(2), (4) Date: Feb. 12, 2009

(87) PCT Pub. No.: WO2007/131275
PCT Pub. Date: Nov. 22, 2007

(65) Prior Publication Data
US 2009/0161866 A1  Jun. 25, 2009

(30) Foreign Application Priority Data
May 12, 2006 (AU) .............................. 2006902502

(51) Int. Cl.
*H04L 29/06* (2006.01)
(52) U.S. Cl. ............ 380/44; 380/46; 380/260; 380/278; 713/400; 709/229; 709/248
(58) Field of Classification Search ............... 380/44, 380/46, 277; 713/160, 182; 705/65; 707/E17.036; 711/221
See application file for complete search history.

(56) References Cited

U.S. PATENT DOCUMENTS

| 5,455,862 | A | * | 10/1995 | Hoskinson | 380/262 |
| 6,445,794 | B1 | * | 9/2002 | Shefi | 380/46 |
| 7,120,696 | B1 | * | 10/2006 | Au et al. | 709/229 |
| 2001/0007127 | A1 | | 7/2001 | Staring | |
| 2003/0093667 | A1 | * | 5/2003 | Dutta et al. | 713/161 |
| 2003/0156721 | A1 | | 8/2003 | Widman | |
| 2005/0154896 | A1 | * | 7/2005 | Widman et al. | 713/182 |
| 2006/0067533 | A1 | * | 3/2006 | Yanovsky | 380/278 |
| 2006/0129501 | A1 | * | 6/2006 | Pastusiak et al. | 705/65 |
| 2007/0074276 | A1 | * | 3/2007 | Harrison et al. | 726/4 |

FOREIGN PATENT DOCUMENTS
WO   WO-01/74004   10/2001
* cited by examiner

*Primary Examiner* — Philip Chea
*Assistant Examiner* — Dorianne Alvarado David
(74) *Attorney, Agent, or Firm* — Fox Rothschild, LLP; Robert J. Sacco

(57) ABSTRACT

In a secure communication system, a first communication device includes a first list of numbers and a first number selector for periodically selecting a different number in the first list. The first communication device further includes a first encryption key generator for generating a first encryption key based on the selected number for generating an encrypted message. A second communication device includes a receiver for receiving the encrypted message, a second list of numbers identical to the first list of numbers, and a second number selector synchronized with the first number selector so as to select the same number as the first number selector, and a second encryption key generator for generating a second encryption key identical to the first encryption key. The second communication device decrypts the encrypted message using the second encryption key. An associated method for providing secure communication of a message between parties is also provided.

16 Claims, No Drawings

SECURE COMMUNICATION METHOD AND SYSTEM

CROSS REFERENCE TO RELATED APPLICATIONS

This application is a U.S. national phase of PCT/AU2007/000639, filed on May 11, 2007, and claims the benefit of Australian Patent Application No. 2006902502, filed on May 12, 2006, both of which are hereby incorporated by reference in their entireties. The International application published in English on Nov. 22, 2007 as WO 2007/131275 A1.

FIELD OF THE INVENTION

The present invention relates to communication systems and, in particular, to systems and methods for providing secure communication between parties.

BACKGROUND TO THE INVENTION

In communication and data security there are numerous encryption schemes used to protect information. Common encryption schemes rely upon the sender and the receiver having a common understanding as to the method used to encrypt the data and common knowledge of the encryption key employed.

An encryption method is usually a mathematical formula that modifies data that is presented in any suitable form. Data can be in analogue or digital form, however, in current communication systems, data is more commonly communicated in digital form. Such data can be many different types of data including text, numbers, voice and video, as examples. The format of the data can vary widely with telecommunication, computing and other standards and can include binary, hexadecimal, decimal, asynchronous, synchronous or packet data, as examples. Within telecommunication systems, the data may be contained with data packet envelopes used by the telecommunication system to route the packet. It may also be surrounded by levels of hand-shaking and error correction protocols of which one generic example is the internationally recognised ISO 7 layer protocol.

An encryption key specifies how the encryption method operates in any one situation. As an illustrative example, a very simple mathematical formula used at the beginning of cryptography, which is the science of encryption, was to replace one letter of the alphabet with another. In such an example, the key might specify the separation between the letters. A Key of "+1" in this example would mean a letter was replaced by another "+1" removed. So an A would become a B and a B would become a C and so on. With a key of +2, an A would become a C and a B would become a D. Minus keys would operate in reverse by substituting earlier letters, for example "−1" would result in an "A" being replaced by a "Z" in a purely alphabetical series.

In modern cryptography, the encryption methods can be quite complex. Common examples include the widely used DES (Data Encryption Standard) and the increasingly employed AES (Advanced Encryption Standard).

In general, the larger the key, the more secure is the encrypted data. This is because a larger key allows greater mathematical possibilities in encryption. For example, a key consisting of two binary bits allows only 4 possibilities for that key. If the encryption method is known, then trying all 4 possibilities will unlock the encrypted data. A 256-bit key, by comparison, allows up to $1.16 \times 10^{77}$ combinations. Therefore, even when the encryption method is known, to unlock data encrypted with a 256-bit key by trial and error is difficult even with high speed computers that are normally employed for such tasks.

In some encryption applications, the key can have two or more parts, one of which may be public and one private to the parties.

Theoretically, the best form of encryption is one which uses a method based upon complete randomness. Clearly a completely random encryption method would be unpredictable and always changing, hence being virtually impossible to crack. However, from a practical perspective, complete randomness is currently impossible to implement in a usable encryption system. An encrypted message also needs to be decrypted. Without some measure of predictability to the encryption method there would be no practical way for an authorised decrypting party to decrypt a randomly encrypted message.

An historical example of an attempt at using randomness in cryptography is the One-Time Pad. A One-Time Pad is a randomly generated list of numbers, letters or symbols longer than the message to be sent and is used as the key to encrypt and decrypt the message. A variety of encryption methods can be used. A simple example is the substitution of one character for another progressively using the contents of the One-Time Pad to make the substitutions. The sender and receiver of messages would both possess the same One-Time Pad which has to be communicated securely between them, usually at some time in the past, and then kept secure prior to use. The sender would encrypt a message using the One-Time Pad. The receiver would use their same One-Time Pad to decrypt the message. If the receiver did not know the One-Time Pad (which of itself is the key in this example), then the sender would be required to inform the receiver of the Pad in an unencrypted manner. Conceivably, the Pad or key could be intercepted and compromised during transmission. However, unless the Pad (key in this case) was intercepted, because the One-Time Pad was randomly generated, it was unpredictable and could not otherwise be deduced without other information. Therefore, even if a codebreaker knew the encryption method it would be impossible to predict the One-Time Pad without additional information. The problem with the One-Time Pad was that if the same One-Time Pad was continuously used, then it was found that codebreakers could eventually recreate the One-Time Pad by using other information such as the structure of language it encrypted or guesses as to the content etc. Therefore, One-Time Pads were only reliably secure when used only once, hence the name.

One-Time Pads have been widely used in the past and may readily be generated by computers using software programs. However, as the volumes of traffic are high, the quantity and length of One-Time Pads becomes very large. It is also costly and difficult to transfer these between geographically remote parties and to keep them secure until required for use. Furthermore the quantity of such pads is difficult and costly to manage, especially in distributed multi-party situations, which is exactly where you do want to use them for security of far-flung operations. Overall, the secure transfer, storage and management of One-Time Pads is prohibitive for all but the most demanding applications.

For these reasons most commercial grade encryption systems use a standard algorithm such as the international Data Encryption Standard (DES) or the Advanced Encryption Standard (AES) and short one or two-part key that can be transferred between the parties with more ease and security than One-Time Pads. Such keys are typically 256 or 512 bits at the time of writing but will inevitably get bigger as computers become faster. The penalty for this, however, is a lower level of resistance to decryption and a large key-management overhead to administer and manage the keys.

In US patent application no. 2003/0156721, there is disclosed an encryption method for communication between units. Each unit is arranged to independently generate the same encryption key. The encryption key is generated based upon a constant "seed" value and a current value appearing on a periodically incrementing counter. The "seed" value is intended to be known only by each unit and the counters of each unit are synchronised so as to provide the same counter value at any particular time. While the disclosed method does provide encrypted communication without requiring any insecure communication of encryption key data, it is noted that the method may prove vulnerable to unauthorised decrypting by a determined codebreaker. Given that the "seed" value never changes, it is a constant and static value. The counter is incremented in a predetermined, fixed rate. Therefore, the counter value at any one time has a direct correlation with time. Hence, once the "seed" value is determined and the counter rate is determined, the encryption method becomes exposed to unauthorised decryption. It is expected that these parameters could be determined after intercepting a certain number of encrypted communications.

It is an object of the present invention to provide an alternative secure communication method which does not require the key itself to be communicated between the authorised parties.

SUMMARY OF THE INVENTION

According to a first aspect of the present invention there is provided a method for providing secure communication of a message between parties, said method including the steps of:

providing, at a sending party, a first list of numbers and first number selection means for periodically selecting a different number in said first list;

providing, at receiving party, a second list of numbers, said second list of numbers, being identical to said first list of numbers, and second number selection means for periodically selecting a different number in said second list, said second number selection means being synchronised with said first number selection means such that, at any given time, said second number selection means selects the same number as said first number selection means;

generating, at said sending party, a first encryption key using first key generating means at a certain time, said first key generation means using the number selected by said first number selection means at said certain time to generate said first encryption key from said first list of numbers;

encrypting a message, at said sending party, using said generated first encryption key;

sending said encrypted message from a first communication device at said sending party;

receiving said encrypted message at a second communication device at said receiving party;

generating, at said receiving party, a second encryption key using second key generation means, said second key generation means using the number selected by said second number selection means at said certain time to generate said second encryption key from said second list of numbers, wherein said second encryption key is identical to said first encryption key;

decrypting, at said receiving party, said received encrypted message using said second encryption key.

According to a further aspect of the present invention there is provided a system for providing secure communication of a message between parties, said system including:

a first communication device, said first communication device including:
  a first list of numbers;
  first number selection means for periodically selecting a different number in said first list;
  first encryption key generating means for generating a first encryption key at a certain time, wherein said first encryption generating means uses the number selected by said first number selection means at a certain time to generate said first encryption key from said first list of numbers;
  encryption means for encrypting a message using said first encryption key; and
  transmitting means for transmitting said encrypted message; and a second communication device, said second communication device including:
  receiving means for receiving said encrypted message;
  a second list of numbers, said second list of numbers being identical to said first list of numbers;
  second number selection means for periodically selecting a different number in said second list, wherein said second number selection means is synchronised with said first number selection means such that, at any given time, said second number selection means selects the same number as said first number selection means;
  second encryption key generating means for generating a second encryption key, wherein said second encryption generating means uses the number selected by said second number selection means at said certain time to generate said second encryption key from said second list of numbers, said second encryption key being identical to said first encryption key; and
  decryption means for decrypting said encrypted message using said second encryption key.

According to a further aspect of the present invention there is provided a communication device, said device including:

memory means storing a list of numbers, said list of numbers being identical to a list of numbers stored at an intended message receiving party;

number selection means for periodically selecting a different number in said list, wherein said number selection means is synchronised with number selection means at said intended message receiving party such that, at any given time, both number selection means select the same number;

encryption key generating means for generating an encryption key at a certain time, wherein said encryption generating means uses the number selected by said number selection means at said certain time to generate said encryption key from said first list of numbers;

encryption means for encrypting a message using said encryption key; and transmitting means for transmitting said encrypted message and an indication of said certain time to said intended message receiving party.

According to a further aspect of the present invention there is provided a communication device, said device including:

memory means storing a list of numbers, said list of numbers being identical to a list of numbers stored at a message sending party;

number selection means for periodically selecting a different number in said list, wherein said number selection means is synchronised with number selection means at said message sending party such that, at any given time, both number selection means select the same number;

encryption key generating means for generating an encryption key at a certain time, wherein said encryption generating means uses the number selected by said number selection means at said certain time to generate said encryption key from said first list of numbers;

receiving means for receiving an encrypted message and an indication of said certain time from said message sending party;

decryption means for decrypting said encrypted message using said encryption key.

Preferred embodiments of the present invention will now be described. While the present invention lends itself to many different implementations, the following examples are intended to illustrate only some possible practical implementations.

DESCRIPTION OF PREFERRED EMBODIMENTS

In general terms, the present invention centres around the practical use of a new encryption scheme based upon a modified use of the One-Time Pad principle using accurate time synchronisation between the communicating parties. Such timing may be derived in a variety of ways including using timing derived from the telecommunications networks on which the parties are communicating. Other timing sources include GPS (Global Positioning System) receivers which offer low cost and high accuracy. Additional synchronised timing systems are available using time broadcast wirelessly such as the services provided by Governments in the UK and US, for example. Alternatively, accurate, synchronised clocks such as Quartz, Rubidium or Caesium timing standards can be used. Irrespective of the source of the timing the essential item is that the two encrypting parties are synchronised in time. This allows a form of "Silent Key Encryption" which in this case means that time is used by both parties to simultaneously select or generate the same encryption key from a very large set of pre-stored numbers using only the time and a method known only to the two encrypting parties. No key has to be passed between the parties for any one transaction. There is typically a different key for every message or communications session. Ideally, the method used by both parties to select the key from the set of pre-stored numbers is different in most if not all key selection events by employing different Hashing Algorithms. This provides "cryptographic depth" as the use of the same method each time could potentially simplify the task of any code-breaker.

A clock derived from a GPS satellite system is a convenient and effective source of accurate time in many cases. The US Department of Defence currently operates a system of satellites for Global Positioning and makes it available for civilian use. The Russian Federation has another system and the European community is planning to launch its own at the time of writing. The GPS system enables users to determine their geographic position with high accuracy and also to derive a highly accurate clock whereby users can be synchronised to each other to accuracies of the order of tens of nanoseconds under good reception conditions. GPS reception is not available in all locations, such as underground and deep inside buildings and for these situations the GPS timing receiver, or alternative timing source, is typically augmented by a free-running clock driven by a stable oscillator to fill in the time as accurately as required between GPS, or other updates of time, and also to provide an accurate frequency source, which may also be used to select the encryption key.

As a possible enhancement to a time dependent encryption scheme, the encryption can also be made to additionally depend on the known physical position of the communicating parties, particularly where the timing is provided by GPS. In this situation physical global position is generally readily available in addition to time. Such an enhanced scheme would be practically suitable for mobile devices such as hand-held PDAs (Personal Digital Assistants) and computers but with wide application in all voice and data devices.

The encryption method may be implemented at a variety of levels of increasing complexity and correspondingly increasing security depending on the requirement. In the most general form, a practical system will consist of the elements described below. These elements are described for two parties communicating electronically using any telecommunication method including wire, cable, fibre-optic and wireless links such as mobile phones and other wireless system without restriction. It is noted that the number of communicating parties is not limited to 2 but may be large. It is anticipated that exemplary embodiments would allow scaling of the system to large numbers of users without compromising security. For simplicity only the two party case is described below.

Overall the encryption system is intended to have the following capabilities:—

End-to-end encrypted voice from:—

Any (enabled) mobile anywhere in the world to any other (enabled) mobile,

Any (enabled) mobile to any (enabled) desk phone,

Any (enabled) desk phone to any other (enabled) desk phone.

End-to-end encrypted data (for example, data link, SMS, e-mail and remote file access) to and from, any combination of (enabled) lap-top PCs, Desk PCs, hand-held PCs and smart-phones.

Any Combination of Telecommunications Links including mobile networks, land-lines, IP and other data Networks. These include high-speed links between major offices such as diplomatic posts or major business offices with sensitive data traffic.

To implement such a system, special purpose hardware and/or software are required at both ends of an encrypted communication. This hardware may consist of combinations of special hardware and software together with generally available equipment such as mobile phones, land-line phones, VoIP phones, data terminals, PCs, Hand-held PCs and smart phones for example or else implementations of the requisite functions on generally available hardware.

To provide the most general level of encryption, the equipment at both ends would practically provide the following capabilities:—

Computing capability,

Encryption Capability either as part of a general computing capability or else as a dedicated encryption engine, Memory Storage, A means of accurate time synchronisation such as a GPS timing receiver aided by a less accurate free-running stable clock for periods when GPS reception or other precise timing source is not available. When the precise timing source is available the otherwise free-running clock would typically be slaved or locked to the most precise timing source available. Other timing systems are usable as long as they allow both ends of the communication to be accurately synchronised.

The encryption scheme can be practically implemented by the use of:—

A One-Time Pad,

A Series of Hashing Algorithms linked to time,

An Encryption Method.

The encrypting devices at both ends of the encrypted transmission are firstly pre-loaded with a One-Time Pad which is a list of numbers which would typically, but not necessarily, be random. The more random the numbers the better the security. This one-time pad is designed for long-term multiple use as an important advantage of the system but can be replaced or refreshed as often as required using any method that is secure such that the one-time pad is known only to the encrypting parties. Depending upon the level of security required, the one time pad has a limited number of re-uses which can be calculated. The larger the number of digits in the One Time Pad, the more secure will be the encryption and the more times the pad can be re-used. For high security, it is important that the One-Time Pad typically be large compared with the size of a typical encryption key. For example, in the year 2006 a typical encryption key might be 256 or 512 binary bits while a desirable one time pad might be 1 million 8 bit bytes of data or much larger; the larger the better within cost and power constraints. A 10 million 8 bit byte pad as an example could be re-used hundreds of thousands of time while maintaining excellent security at the current state of the art as an example.

Typically, such a one time pad would be stored in both communicating devices before they were physically given to the users. Alternatively, it could be initially stored or refreshed with new data as required using a variety of secure physical or telecommunication means at whatever time interval was considered suitable, but desirably years in many practical applications, this being achieved by using large pads. The essential feature of such one time pads is that they are known only to the two communicating devices and to no others and that they are very large compared with encryption keys to be used later in the process.

In practical application, the encryption scheme uses the pre-stored One-Time Pad, selecting parts of it to generate and provide an encryption key to the encrypting computing resource or encryption engine. The encrypting device uses a key as part of an encryption method which is a mathematical formula or transform, such as DES or AES or some other encryption standard.

Importantly, the selection or generation of a unique key is based upon the time of the desired encrypted communication.

An example of how this operates is as follows:

Both ends of the desired encrypted communication possess the same one-time pad which is available to no other parties. The two parties are synchronised in time using one or other of the said timing sources. Both parties start at a pre-agreed time to move through their respective One-Time Pads. This is typically done in software by using a software pointer. For example, both parties might have identical One-Time Pad of say a million bytes of alphanumeric data. Both start simultaneously to move though this One-Time Pad at the same rate on a continuous basis. The initial rate at which they move through this One-Time Pad is a pre-agreed rate between the encrypting parties. For example, it may be one digit of the One-Time Pad every 2.375 seconds. Ideally, the rate is not an integer number of seconds so as to add complexity to any unauthorised person attempting to decode the encrypted message. Prime number relationships between different rates on different occasions are also undesirable.

It will be appreciated that, while the movement through the one time pad may be a direct function of time, the actual value indicated at any one time has no correlation to time. Therefore, without an actual copy of the one time pad, or knowledge of where in the large list of numbers the current value is, there is no practical way of an unauthorised party from knowing what the actual value currently indicated or selected may be.

The rate at which both parties move through the One-Time Pad can be variable as long as both parties remain synchronised. When a party wishes to initiate an encrypted communication it calls the other party signalling in any suitable form that it wishes such a communication and this action will select the same point within the One-Time Pads at both ends. It needs to be recognised that any electronic communication between the parties will involve some delay due to the total transit time of the signal and any delays in the electronic circuitry and software in both directions. Both directions are important as most communications are bi-directional. These delays, known as the system latency, can often be variable and needs to be allowed for. There are several methods for doing this, with the simplest being to set the rate at which both parties step through their one time pads to be slower than the system latency. A variety of other methods for overcoming system latency problems are available, one of which will be discussed later. The encrypted message can be started at the time of the request or alternatively it is possible to pre-arrange the start-time of the encrypted message. That start time can be any time in the future, typically further in time than the latency of the telecommunications network. This start time does not need to be a fixed time but only one chosen by both synchronised parties using a pre-agreed method or algorithm. This means that while the message requesting a secure communication takes up to 1 second, as an example, to go from one party to the other and back, the parties themselves can be synchronised to a much higher accuracy.

At the agreed start time of the encrypted communication, both parties note the point that they have reached in the One-Time Pad. This will be the same for both parties within the accuracy of the synchronisation between the parties. In the event of an error of 1 or more digits due to synchronisation drift, the software at either end will have the capability to advise the other end of the error and compensate for it as described below. For simplicity of description, it is assumed that the Start Time will be chosen by an algorithm to be such as to ensure that, for the accuracy of the clocks employed and the system latency, both parties are precisely synchronised as to their position in the One-Time Pad. No other party has knowledge of any of the contents of the One-Time Pad; the initial time of synchronisation of the parties equipment; the rate they moved through the One-Time Pad and the Start-Time of the encrypted communications. This means that the parties, in the example given are synchronised to a precise binary digit in a list of 8 million such digits for the example of a 1 million byte One Time Pad.

At this stage, the Hashing Algorithm is brought into play. Each end prestores at the time that it stores the One Time Pad, a large number of Hashing Algorithms, one for each preset period of time or one for each event such as a single encryption session. For example, there could be one for each Julian hour of the year for a number of years. Alternatively there could be one per day and so on with the practical limit being the memory size of the devices at each end of the encrypted communications. In the case of event related hashing algorithms, the two parties simply use one hashing algorithm for each transaction. A transaction can be a data packet or an encryption session or any other event as long as both sides clearly know that the other end has fully completed whatever event was agreed. If they did not do this, the hashing algorithms could get out of step.

A Message Entry Hashing Algorithm is defined as a mathematical formula that is used to choose the encryption key starting at the point reached in the One-Time Pad at the desired start of the encrypted transaction or some agreed relative time to that. An example of such a hashing algorithm might be, "Choose every third digit starting at the position of the pointer in the One-Time Pad". Another might be, "Choose every second digit starting at the position of the pointer in the One-Time Pad". These are simple examples and it will be appreciated that in practice that quite complex Hashing Algorithms would be employed.

In practice, the combination of the synchronised agreed Start Time, for the encrypted session, and the Message Entry Hashing Algorithm are used to select or generate an encryption key which would typically be 256 or 512 binary bits in the year 2006. Conceivably, the encryption key could be any number of bits or digits and will no doubt grow as computers become faster. However, in practice, the encryption key should be very small compared with the size of the One-Time Pad. This size limitation means that the One-Time Pad can be re-used a large number of times while maintaining excellent security for each communication as each uses a key which is a small set of numbers chosen uniquely from a very large set. This effectively creates a large number of virtual One-Time Pads as each appears different depending upon its Starting point and the Hashing Algorithm used.

There is an effective limit on repetitions however as too many uses could lead to the derivation of the original One-Time Pad, however, this is very large and very difficult to do, resulting in the system offering high security for a very large number of transactions without requiring the One-Time Pad to be replaced.

The encryption key generated on each occasion is used by the encryption processor or engine to encrypt the message using an encryption method such as DES or AES or any other suitable mathematical formula or transform.

It will be appreciated that the methodology could be adapted to extend to use of multi-part keys, such as part private, part public keys.

Once the encrypted communication is completed, the movement though the Original One-Time Pad is restarted at a selected time. This is done by a second Hashing Algorithm which is known as the Message Exit Hashing algorithm whereas the previously discussed Hashing Algorithms were the Message Entry Hashing Algorithms. The Message Exit Hashing Algorithm is also known only to both parties to the encrypted communication having a large number pre-stored at both ends at the same time as the One Time Pad was stored. Both Message Entry and Message Exit Hashing Algorithms are typically used on a time determined basis but could be on a per message or per event basis as previously described. In either event, both Hashing Algorithms expire with either time or message number and are then typically deleted from any terminal device. This is done to prevent any undesired person who steals or compromises a device, and obtains the One-Time Pad in the device from back-tracking through it to any earlier time period or message, as the case may be, and deducing the encryption key used in any one case prior to the deletion of the last Hashing Algorithms left undeleted in the device. This provides improved security.

It is anticipated that the geographic position of the parties could also be used as part of the key and encryption method used. The geographic position would be provided by the GPS system and might be communicated between the communicating parties. This would allow the use of combined time and position based algorithms.

In practice, if a large number of parties have encryption devices, it may be undesirable for security reasons that they should all share the same One-Time Pad and Hashing Algorithms. Therefore, in a preferred practical application, calls from one party to another would be conducted via a trusted third party. This opens up the potential for each party having their own unique One-Time Pad and unique Hashing algorithms, which each shares only with a Trusted Secure Central Site. A calling party would establish a secure encrypted communications session with the Trusted Secure Central Site (TSCS), using the calling party's unique One-Time Pad and Hashing algorithms, and identifying an intended called party. The TSCS would then establish a second secure encrypted communication session with the identified called party using the called party's unique One-Time Pad and Hashing algorithms. Both parties, therefore, would have unique secure communications with the TSCS which decrypts and re-encrypts between the parties as required. The only place that the encrypted message is in the clear is within the TSCS itself.

An alternative to the above is when parties wish to communicate directly with each other without transiting the TSCS. In this case, the calling party establishes an encrypted session with the TSCS which in turn establishes an encrypted session with the receiving party as above. However, rather than passing the communication through the TSCS, the TSCS passes a new key valid for a set period or event or number of events to both parties inside the encrypted session established as above, and then breaks the communication links. The parties then share the same encryption key and can then call each other and establish a direct encrypted communication for the validity of the key. By extension, multiple parties may simultaneously conference call with each other using secure unique communications sessions. Parties may also communicate with computers, servers, storage devices and others, within the TSCS in a secure encrypted manner.

Another practical use of the TSCS is the securing of data stored within mobile devices or devices which can be lost, stolen or compromised. For such devices, it is important that any data or message of any kind, that is sensitive, be stored in an encrypted form inside the device. The TSCS implementation as used for establishing encrypted communications between parties can also be adapted for use to derive a unique key for storing any document, data or message within the memory or storage capability of the device by using an encryption key based upon the time of storage or some other selected time related to the information being encrypted. Thus each piece of information stored can have a unique time stamp. The message will however record the time stamp used in unencrypted form as part of the message header.

For this purpose, given that the Hashing algorithms expire as described, not just for communications but for storing data, the terminal device is therefore incapable of recreating the encryption key used to encrypt each piece of information stored in this manner. When it needs to decrypt a document or message or data that is so encrypted, the terminal can establish a new encrypted session with the TSCS and pass the time stamp used to encrypt that piece of information to the TSCS. The TSCS would be required to not allow the Hashing Algorithms to expire so that it can recreate the encryption key from the relevant time. This feature can be used to require the terminal user to access the central site for each message as a separate transaction thus allowing the central site control over the terminal devices contents at a level appropriate to the circumstances.

It was discussed above that telecommunications system latency can delay messages between otherwise perfectly synchronised parties. Whereas in most cases this is simply handled by setting the rate at which each user steps through their one time pads as being longer than the system latency in some cases, there may be large and unexpected delays in telecommunications systems that could cause the software pointers at both ends to get out of effective synchronisation even if they are perfectly synchronised otherwise. To obviate this possibility both parties could run a timer running at preferably different speeds to each other, but such speed known only to both parties and pre-agreed by them at the time the original One Time Pad was stored. Such timers will typically run much faster than the system latency and therefore much faster than the pointer steps through the one time pad. The times shall be accurate and may be slaved off the main system timing reference. They will preferably count between two pre-agreed numbers which shall preferably be different for both ends, say 27 and 132,000 as an example for one end and shall preferably start with pre-agreed but different offsets from real time as known at each end. They shall complete their respective counts within a period much longer than the worst case telecommunications latency, say 2 seconds (as typical of most networks) and then restart their respective counts repeating endlessly. So, there may be one full set of counts, say, every approximate 30 seconds, but not limited to that. At the time of encryption, the number reached by each counter can be transmitted in unencrypted form and this will then allow the other end to determine the system latency and any synchronisation error without involving the key generation mechanism in any way. The two timers would not be synchronised in any way to the key generating mechanism and, in an information sense, would be asynchronous.

While the present invention has been described with reference to specific embodiments of the invention, it will be appreciated that various modifications and changes could be made without departing from the scope of the invention.

The invention claimed is:

1. A method for providing secure communication of a message between parties, said method including the steps of:
provide, at a sending party, a first list of numbers and a first number selector for periodically selecting a different number in said first list;
providing, at a receiving party, a second list of numbers, said second list of numbers, being identical to said first list of numbers, and a second number selector for periodically selecting a different number in said second list, said second number selector being synchronised with said first number selector such that, at any given time, said second number selector selects the same number as said first number selector;
generating, at said sending party, a first encryption key using a first key generator at a certain time, said first key generator using the number selected by said first number selector at said certain time to generate said first encryption key from said first list of numbers;
encrypting a message, at said sending party, using said generated first encryption key;
sending said encrypted message from a first communication device at said sending party;
receiving said encrypted message at a second communication device at said receiving party;
generating, at said receiving party, a second encryption key using a second key generator, said second key generator using the number selected by said second number selector at said certain time to generate said second encryption key from said second list of numbers, wherein said second encryption key is identical to said first encryption key;
decrypting, at said receiving party, said received encrypted message using said second encryption key;
wherein the identical first and second lists of numbers are comprised of true random numbers and are not communicated via or exposed to the communication channel used to transmit said encrypted message; and wherein said first key generator employs a hashing algorithm comprising a mathematical formula for selecting numbers and optionally modifying selected numbers to generate said first encryption key from said first list of numbers and said second key generator employs the same hashing function to generate said second encryption key from said second list of numbers.

2. The method according to claim 1, wherein said sending and receiving parties are provided with a plurality of selectable hashing algorithms for employment with said first and second key generators, said sending and receiving parties being respectively arranged to select the same hashing algorithm as each other.

3. The method according to claim 1, wherein said sending and receiving parties delete the hashing algorithm after being employed.

4. A system for providing secure communication of a message between parties, said system including:
a first communication device, said first communication device including:
a first list of numbers;
a first number selector for periodically selecting a different number in said first list;
a first encryption key generator for generating a first encryption key at a certain time, wherein said first encryption key generator uses the number selected by said first number selector at a certain time to generate said first encryption key from said first list of numbers;
an encryptor for encrypting a message using said first encryption key; and
a transmitter for transmitting said encrypted message; and
a second communication device, said second communication device including:
a receiver for receiving said encrypted message;
a second list of numbers, said second list of numbers being identical to said first list of numbers;
a second number selector for periodically selecting a different number in said second list, wherein said second number selector is synchronised with said first number selector such that, at any given time, said second number selector selects the same number as said first number selector;
a second encryption key generator for generating a second encryption key, wherein said second encryption key generator uses the number selected by said second number selector at said certain time to generate said second encryption key from said second list of numbers, said second encryption key being identical to said first encryption key; and
a decryptor for decrypting said encrypted message using said second encryption key;
wherein the identical first and second lists of numbers are comprised of true random numbers and are not communicated via or exposed to the communication channel used to transmit said encrypted message; and wherein said first key generator employs a hashing algorithm comprising a mathematical formula for selecting numbers and optionally modifying selected numbers to generate said first encryption key from said first list of numbers and said second key generator employs the same hashing function to generate said second encryption key from said second list of numbers.

5. The system according to claim 4, wherein said first and second communication devices are provided with a plurality of selectable hashing algorithms for employment with said first and second encryption key generators, said first and second communication devices are respectively arranged to select the same hashing algorithm as each other.

6. The system according to claim 4, wherein said first and second communication devices are arranged to delete the hashing algorithm after being employed.

7. A communication device, said device including:
- a memory storing a list of true random numbers, said list of numbers being identical to a list of numbers stored at an intended message receiving party;
- a number selector for periodically selecting a different number in said list, wherein said number selector is synchronised with a number selector at said intended message receiving party such that, at any given time, both number selectors select the same number;
- an encryption key generator for generating an encryption key at a certain time, wherein said encryption key generator uses the number selected by said number selector at said certain time to generate said encryption key from said list of numbers;
- an encryptor for encrypting a message using said encryption key; and
- a transmitter for transmitting said encrypted message and an indication of said certain time to said intended message receiving party;
- wherein said stored list of numbers and information concerning a selection of said different number from said stored list of numbers is not communicated via or exposed to the communication channel used for transmitting said encrypted message; and wherein said encryption key generator employs a hashing algorithm comprising a mathematical formula for selecting numbers and optionally modifying selected numbers to generate said encryption key from said list of true random numbers.

8. The communication device according to claim 7, wherein said communication device is provided with a plurality of selectable hashing algorithms for employment with said encryption key generator.

9. The communication device according to claim 7, wherein said communication device is arranged to delete the hashing algorithm after being employed.

10. A communication device, said device including:
- a memory storing a list of true random numbers, said list of numbers being identical to a list of numbers stored at a message sending party;
- a number selector for periodically selecting a different number in said list, wherein said number selector is synchronised with a number selector at said message sending party such that, at any given time, both number selectors select the same number;
- an encryption key generator for generating an encryption key at a certain time, wherein said encryption key generator uses the number selected by said number selector at said certain time to generate said encryption key from said list of numbers;
- a receiver for receiving an encrypted message and an indication of said certain time from said message sending party;
- a decryptor for decrypting said encrypted message using said encryption key;
- wherein said stored list of numbers and information concerning a selection of said different number from said stored list of numbers is not communicated via or exposed to the communication channel used for transmitting said encrypted message; and wherein said encryption key generator employs a hashing algorithm comprising a mathematical formula for selecting numbers and optionally modifying selected numbers to generate said encryption key from said list of true random numbers.

11. The communication device according to claim 10, wherein said communication device is provided with a plurality of selectable hashing algorithms for employment with said encryption key generator.

12. The communication device according to claim 10, wherein said communication device is arranged to delete the hashing algorithm after being employed.

13. The method according to claim 2, wherein said sending and receiving parties delete the hashing algorithm after being employed.

14. The system according to claim 5, wherein said first and second communication devices are arranged to delete the hashing algorithm after being employed.

15. The communication device according to claim 8, wherein said communication device is arranged to delete the hashing algorithm after being employed.

16. The communication device according to claim 11, wherein said communication device is arranged to delete the hashing algorithm after being employed.

* * * * *